United States Patent
Pique Corchs et al.

(10) Patent No.: US 10,028,022 B1
(45) Date of Patent: Jul. 17, 2018

(54) DYNAMIC CONTROL OF MEDIA EFFECTS BASED ON HARDWARE PERFORMANCE

(71) Applicant: Facebook, Inc., Menlo Park, CA (US)

(72) Inventors: Hermes Germi Pique Corchs, London (GB); Kirill A. Pugin, Sammamish, WA (US); Razvan Gabriel Racasanu, Mountain View, CA (US); Colin Todd Miller, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/626,072

(22) Filed: Jun. 16, 2017

(51) Int. Cl.
*H04N 21/4402* (2011.01)
*G11B 27/031* (2006.01)
*G06T 7/246* (2017.01)
*H04N 21/439* (2011.01)
*H04N 21/44* (2011.01)
*H04N 21/442* (2011.01)
*H04N 21/45* (2011.01)
*H04N 21/81* (2011.01)

(52) U.S. Cl.
CPC ..... *H04N 21/440281* (2013.01); *G06T 7/246* (2017.01); *G11B 27/031* (2013.01); *H04N 21/4394* (2013.01); *H04N 21/44008* (2013.01); *H04N 21/44209* (2013.01); *H04N 21/44222* (2013.01); *H04N 21/4532* (2013.01); *H04N 21/816* (2013.01); *H04N 21/8106* (2013.01); *G06T 2207/10016* (2013.01); *G06T 2207/30201* (2013.01)

(58) Field of Classification Search
CPC ......... H04N 21/44028; H04N 21/4394; H04N 21/44008; H04N 21/44209; H04N 21/44222; H04N 21/4532; H04N 21/816; H04N 21/8106; G11B 27/031; G06T 7/246
USPC .......................... 386/280, 278, 284, 281, 290
See application file for complete search history.

(56) References Cited

U.S. PATENT DOCUMENTS

2015/0243250 A1* 8/2015 Fukuda ................... G09G 5/02
345/589

* cited by examiner

Primary Examiner — Robert Chevalier
(74) Attorney, Agent, or Firm — Fenwick & West LLP

(57) ABSTRACT

A media effects engine on a computer device applies one or more effects to an input media stream. A performance monitor monitors a performance metric associated with playing the input media stream and reduces a quality parameter associated with the effect upon detecting a drop in the performance metric below a target metric. The quality parameter manages a tradeoff between a quality of effect and an amount of hardware resources consumed to produce the effect. Thus, the effect can be adjusted to meet the capabilities of the computer device.

20 Claims, 3 Drawing Sheets

US 10,028,022 B1

DYNAMIC CONTROL OF MEDIA EFFECTS BASED ON HARDWARE PERFORMANCE

BACKGROUND

This disclosure relates generally to controlling effects during playback of media content.

Users of client devices increasingly capture media such as images, video, and audio and share the captured media with other users. For example, through an application associated with an online system executing on a client device, a user of the client device distributes media data captured via the client device, or otherwise obtained via the client device, to other users of the online system. To encourage user engagement, many applications allow a user of the client device to modify media data obtained by the client device and subsequently present the modified media data.

For example, various applications allow users to apply filters to video data obtained by a client device or to overlay text or images onto portions of video data obtained by the client device. However, conventional methods for applying such filters or other effects may be computationally intensive. Thus, depending on the particular capabilities of the device, such effects may cause undesired drops in performance.

SUMMARY

A method, non-transitory computer-readable storage medium, and computing device dynamically controls a selected effect applied to a media stream. An input media stream is received at an effects engine. A quality parameter (e.g., a frame rate or latency) is set to an initial quality parameter value. The quality parameter controls a quality of the selected effect and an amount of computing resources used to apply the selected effect. An effects engine applies the selected effect to a first portion of the input media stream according to the initial quality parameter value to generate a first portion of an output media stream. A performance metric of the first portion of the output media stream is monitored and compared to a target metric. Responsive to detecting that the performance metric of the first portion of the output media stream is below the target metric, the quality parameter associated with the selected effect is reduced to a reduced quality parameter value. The effects engine applies the selected effect to a second portion of the input media stream according to the reduced quality parameter value to generate a second portion of the output media stream. The output media stream is outputted (e.g., to a display device).

The figures depict various embodiments for purposes of illustration only.

Figure 3:
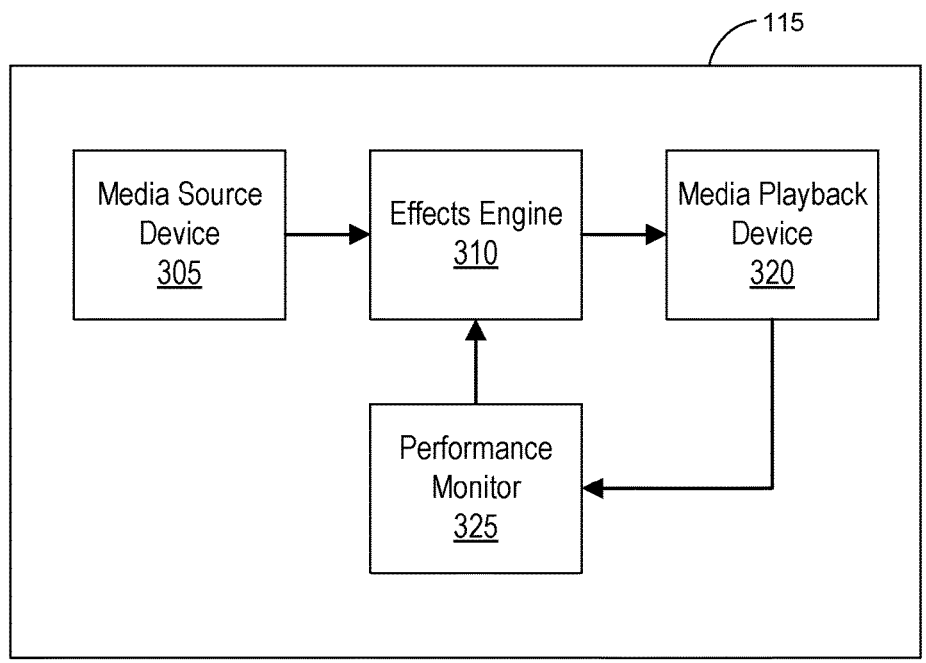

FIG. 3 is a block diagram of an example media processing sub-system, in accordance with one embodiment.

Figure 4:
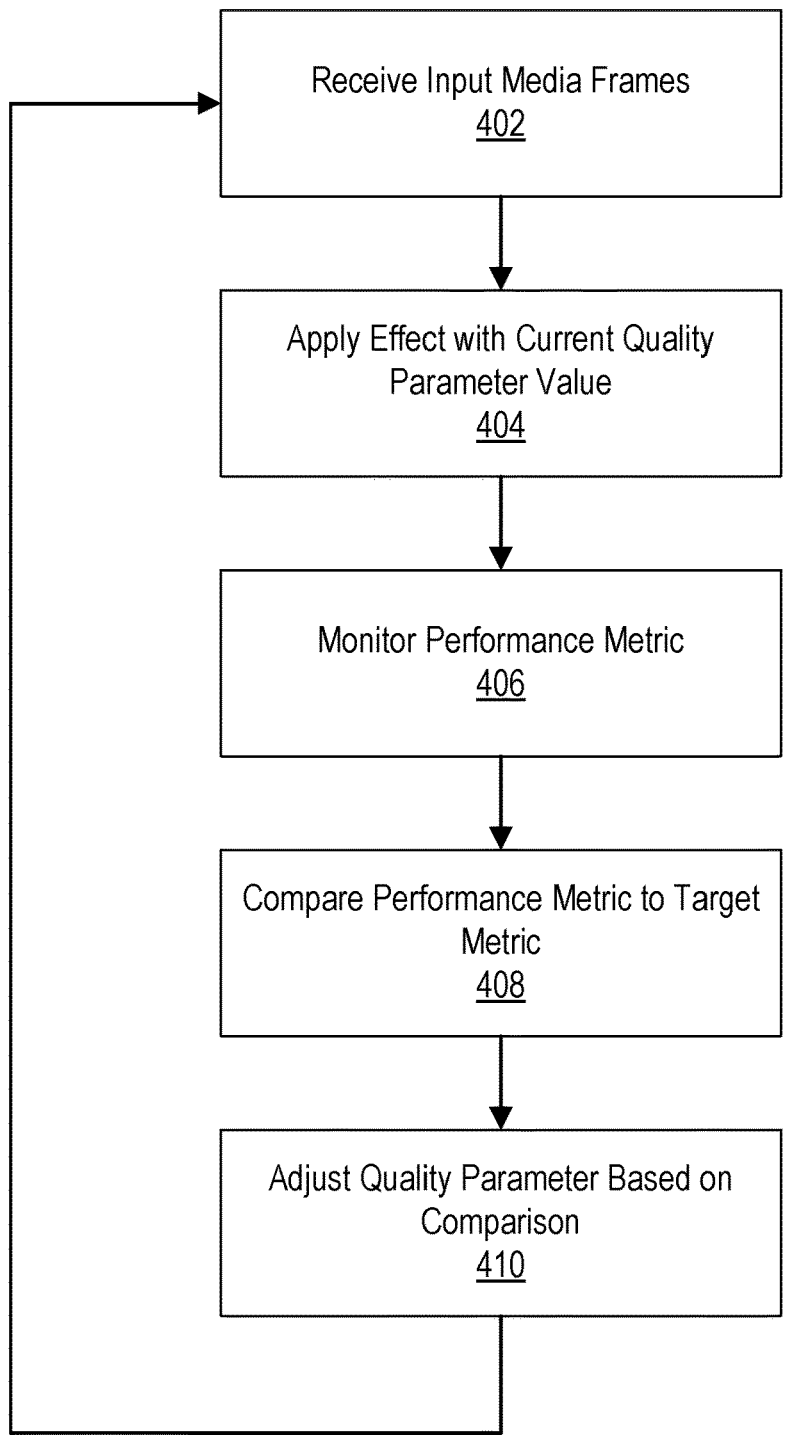

FIG. 4 is a flowchart illustrating an embodiment of a process for dynamically controlling an effect based on hardware performance.

One skilled in the art will readily recognize from the following discussion that alternative embodiments of the structures and methods illustrated herein may be employed without departing from the principles described herein.

DETAILED DESCRIPTION

Overview

A media effects engine on a computer device applies one or more effects to an input media stream. A performance monitor monitors a performance metric associated with playing the input media stream and reduces a quality parameter associated with the effect upon detecting a drop in the performance metric below a target metric. The quality parameter manages a tradeoff between a quality of effect and an amount of computing or memory resources consumed to produce the effect. Thus, the effect can be automatically adjusted to meet the capabilities of the computer device.

System Architecture

Figure 1:
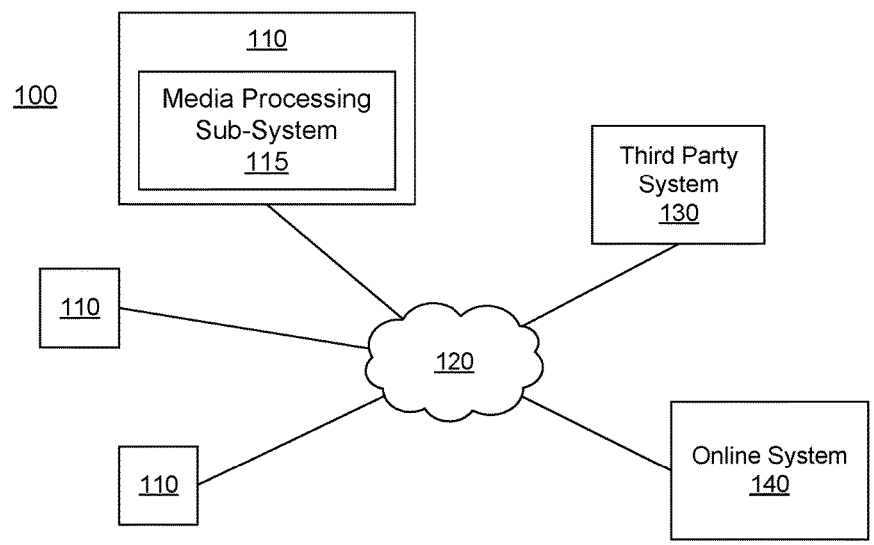
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, a messaging server, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

As further described below in conjunction with FIG. 3, in various embodiments a client device 110 includes a media processing sub-system 115 that may include a media capture device capable of capturing media (e.g., video or audio), an application for modifying the captured media, and an application for sharing the modified media with one or more other users (e.g., via a messaging application or social networking application). For example, an application executing on the client device 110 allows a user of the client device 110 to apply a filter or overlay additional content onto portions of video data captured by an image capture device or otherwise obtained by the client device 110. The application may also allow the user to exchange the modified video data and other content (e.g., text messages, images, etc.) with other users of the online system 140.

In a particular example, the media processing sub-system 115 of the client device 110 may detect a face in a video, identify one or more facial feature locations in the detected face, and apply a filter or overlay to alter the depiction of the face in some way. For example, the filter may produce an effect of adding an animated mask to the face that fits the user's facial features and mimics the user's movements. An application on the client device 110 may enable to quickly select different filters while a camera is capturing video of the user's face and provide a display of the modified video in real-time or near-real time as it is captured. In a particular embodiment, a user can capture a snapshot of a frame of the video with the rendered effect for storing or sharing with other users in the online system 110. An example client device 110 is further described below in conjunction with FIG. 3.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Various third party systems 130 provide content to users of the online system 140. For example, a third party system 130 maintains pages of content that users of the online system 140 may access through one or more applications executing on a client device 110. The third party system 130 may provide content items to the online system 140 identifying content provided by the online system 130 to notify users of the online system 140 of the content provided by the third party system 130. For example, a content item provided by the third party system 130 to the online system 140 identifies a page of content provided by the online system 140 that specifies a network address for obtaining the page of content.

Figure 2:
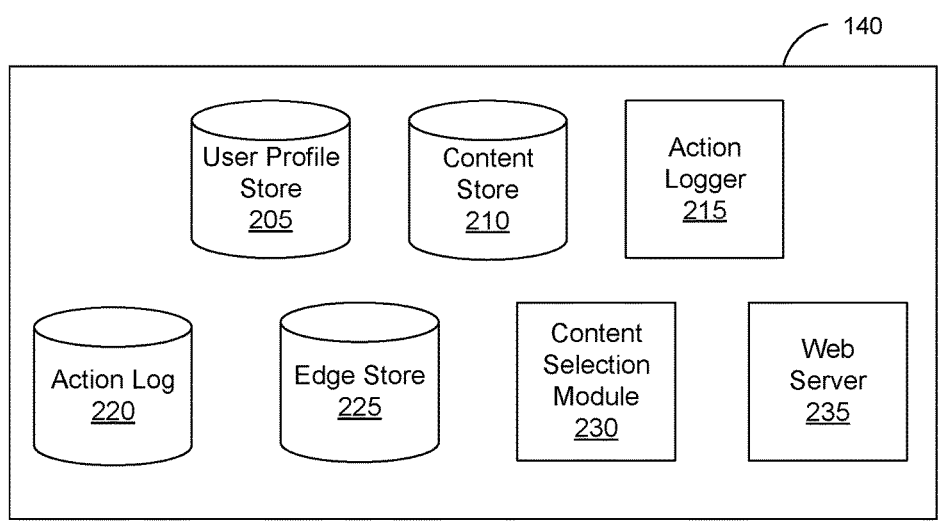
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a content selection module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image, with information identifying the images in which a user is tagged stored in the user profile of the user. A user profile in the user profile store 205 may also maintain references to actions by the corresponding user performed on content items in the content store 210 and stored in the action log 220.

Each user profile includes user identifying information allowing the online system 140 to uniquely identify users corresponding to different user profiles. For example, each user profile includes an electronic mail ("email") address, allowing the online system 140 to identify different users based on their email addresses. However, a user profile may include any suitable user identifying information associated with users by the online system 140 that allows the online system 140 to identify different users.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other social networking system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represents various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

In various embodiments, the content store 210 includes media data captured by a client device 110. The client device 110 may communicate the media data (which may be modified by one or more user-selected effects) to the online system 140, which stores the video data in the content store 210. In various embodiments, the online system 140 receives information identifying a user of the online system 140 along with the media data and stores the information identifying the user in association with the media data. The online system 140 may retrieve media data from the content store 205 and provide the media (which may be modified by one or more user-selected effects) to client devices 110 associated with other users of the online system 140 in response to receiving a request from the user.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on characteristics associated with the user by the online system 140 and based on the user's affinity for different content items. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having the highest positions in the ranking or having at least a threshold position in the ranking for presentation to the user.

In various embodiments, the content selection module 230 presents content to a user through a newsfeed including a plurality of content items selected for presentation to the user. One or more content items may also be included in the feed. The content selection module 230 may also determine the order in which selected content items are presented via the feed. For example, the content selection module 230 orders content items in the feed based on likelihoods of the user interacting with various content items.

The web server 235 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, WEBOS® or BlackberryOS.

Media Processing Sub-System

FIG. 3 is a block diagram of one embodiment of a media processing sub-system 115 of a client device 110. The media processing sub-system 115 includes a media source device 305, an effects engine 310, a media playback device 320, and a performance monitor 325. In other embodiments, the media processing sub-system 115 may include additional, fewer, or different components for various applications. Further, various components of the media processing sub-system 115 may provide various combinations of the functionality further described below in some embodiments. In an embodiment, one or more components of the media processing sub-system 115 may be implemented as instructions stored to a computer-readable storage medium that when executed by a processor of the client device 110 causes the processor to carry out the functions attributed to the components as described herein.

The media source device 305 is any device capable of providing image, audio, or video data. The media source device 305 may comprise a capture device that may provide the media directly to the effects engine 310 as it is captured. For example, the media source device 305 may include one or more still image cameras, one or more video cameras, one or more microphones and associated audio processing components, or any other device capable of capturing media content. Different client devices 110 may have media source devices 305 having different characteristics. For example, in the case of cameras, camera may operate with different capture resolutions, shutter speeds, frame rates, focal lengths, apertures, encoding protocols, compression algorithms, audio bit rates, etc. Alternatively, the media source 305 may comprise a storage medium that stores media (e.g., as a digital file) that can be read by the effects engine 310. In yet another embodiment, the media source device 305 may comprise a network interface that enables the client to receive a media stream from another client (e.g., via the network 120). In this embodiment, the media source device 305 may receive the media stream via e.g., a messaging application that enables a user to receive direct messages from another user via the network or a social networking application that enables a user to access posts on a social networking site that includes the media content. While FIG.

3 shows a client device 110 having a single media source device 305, in various embodiments, client devices 110 may include multiple source capture devices 305 (e.g., a storage, a camera, and a microphone).

The effects engine 310 receives media from the media source device 305 and applies an effect to alter the media. For example, the effects engine may overlay text, image, or video content on a video received by the effects engine 310. In another example, the effects engine 310 may apply a filter to a video to introduce lighting effects, color alteration effects, motion effects, distortion effects, cropping effects, zooming effects, or other special effects. In a particular example, the effects engine 310 may produce an effect of adding an animated mask to the face that fits the user's facial features and mimics the user's movements. In yet other embodiments, effects may be performed on audio rather than image data.

To implement the various effects, the effects engine 310 may extract information from the received media content that is utilized in applying the desired effect. For example, the video effects engine 310 may detect locations of objects, such as faces, from various frames of video data. In the case of facial detection, the effects application may furthermore detect locations of specific facial features in the face that are used to render a particular effect (e.g., an animated mask effect). As another example, the effects engine 310 determines optical flow vectors describing movement of objects or other components of the video data based on various frames of the video data. In yet other examples, information is extracted from video data to track one or more objects across various frames of the video data (e.g., through application of one or more particle filters to the video data) or to identify changes in one or more objects detected in the video data (e.g., a change in expression of a face detected in the video data).

The effects engine 310 may furthermore render the effect based on the extracted information. For example, the effects engine may overlay text, images, or video on one or more portions of the video data according to tracked locations of features identified in the video. In other embodiments, the rendered effect may include altering a playback speed of the media, modify audio included in one or more portions of the media, identify and tag movement of objects in the video data, modify shading or coloring of one or more frames of the video data, distorting an object or face within the video data, or other desired modifications.

In one embodiment, the effects engine 310 may separate the extraction of information and the application of the effect in a pipelined process. For example, the effects engine may store the information extracted from media content as metadata associated with the media content, and then uses the metadata to apply a desired effect. Separating the extraction process from the rendering process may beneficially enable the effects engine to more efficiently apply multiple effects or switch between different effects that may utilize the same underlying data. For example, in an application that enables a user to select between various facial effects, the same facial tracking feature may be used to apply different effects. Thus, once the face is detected and facial feature locations are tracked, different effects using this information may be applied without re-detecting the face or facial feature locations. Furthermore, the metadata extraction and effect application may performed in a pipelined manner such that at a given time, an effect is applied to one frame or group of frames while metadata is extracted from another frame or group of frames.

In an embodiment, the effects engine 310 may apply the effect based on a quality parameter that controls a tradeoff between a quality of a rendered effect and an amount of hardware resources (e.g., processing, storage, or network resources) used to render the effect. For example, under at a first quality parameter value, an effect may be rendered with very high quality but may consume a significant amount of hardware resources, while under a second set of parameters, the effect may be rendered with lower quality while consuming fewer hardware resources. The quality parameter may comprise, for example, a resolution of an overlaid image or video, a precision metric (e.g., a number of facial features used to implement an effect based on facial tracking), a binary operator that turns off or on an optional part of the effect (e.g., whether or not a color correction processing algorithm is applied), or other parameter that affects a tradeoff between quality and hardware resource usage. Alternatively, the quality parameter may comprise a high-level parameter that controls multiple different sub-parameters used in rendering the effect. For example, each discrete value of the quality parameter for a given effect may map to a plurality of predefined sub-parameter settings stored in a lookup table. Thus, for a particular quality parameter, sub-parameters may be set to different predefined values or may be turned on or off in a binary manner according to the lookup table. In an embodiment, a quality parameter may include only two possible values (e.g., a high value or a low value). In other embodiments, an effect may be configured to operate according to any number of possible quality parameters.

In an embodiment, an application executing on the client 110 provides a user interface that enables a user to select a particular effect from a plurality of selectable effects. The effect may be applied in real-time or near real-time as the effect is selected. For example, in one embodiment, the media source device 305 may provide a stream of video frames to the effects engine 310, and the effects engine applies the effect to the frames as they are received.

The media playback device 320 receives the processed media from the effects engine 310 and plays the media. For example, the media playback device 320 may comprise a display screen such as a liquid crystal display (LCD), an organic light emitting diode (OLED) display, an active matrix liquid crystal display (AMLCD), or any other suitable display device. The media playback device 320 may furthermore comprise one or more speakers for playing audio. Different client devices 110 may have media playback devices 320 with different capabilities. For example, different client devices 110 have media playback devices 320 with different display areas, different resolutions, or differences in other characteristics. Furthermore, different client devices 110 may have different processing and memory resources available for rendering a particular effect. Thus, the quality parameter may be controlled differently on different devices to enable different devices to each manage the trade-off between quality of the effect and resource consumption.

The performance monitor 325 monitors a performance metric of the media playback device 320 during playback of the media and adjusts the quality parameter based on a comparison of the monitored performance metric to a target metric. For example, in one embodiment, a video frame rate of the video outputted by the media playback device 320 is monitored and compared to a target frame rate. If the video frame rate does not meet the target metric, this indicates that the effects engine 310 may not have sufficient hardware resources (e.g., processing, memory, or networking resources) available to maintain the target frame rate. Thus, the quality parameter may be decreased in order to reduce the processing, storage, or network bandwidth burden of generating the effect and enable the media playback device 320 to achieve the target frame rate. In another embodiment, the performance monitor 325 may monitor a latency of an audio output from the media playback device 320 and adjust the quality parameter of an audio effect based on a comparison between the measured latency and the target metric. In other embodiments, the performance monitor 325 may adjust the quality parameter of one or more effects based on other measured characteristics of the output media such as bit rate, resolution, or other metrics.

In one embodiment, the quality parameter may be adjusted in a smooth manner such that it gradually transitions between values over time (e.g., by applying a smoothing filter to the change in quality parameter). This enables an effect to be degraded gracefully (instead of abruptly transitioning) so that it is less noticeable to the user. Furthermore, the smoothing function may prevent or reduce rapid transitions between quality parameter values that may produce noticeable artifacts in the applied effect. In one embodiment, a smooth transition is applied only when going to a higher quality parameter, but a faster transition is executed when going to a lower quality parameter so that the target metric can be achieved more quickly.

The target metric may be set based on the particular capabilities of the client device 110. For example, the target metric may be determined based on the camera capabilities, battery life, available memory, processor speed, or other factors. Thus, for example, a client device 110 having a high frame rate camera, high memory capacity and a fast processor may set a higher target frame rate as the target metric than a client device 110 with a lower frame rate camera, lower memory capacity, and a slower processor. Furthermore, the target metric may be set lower when the battery level is below a predefined threshold in order to conserve resources when the battery is low.

In one embodiment, the performance monitor 325 monitors performance (e.g., throughput) associated with multiple different effects (or separate algorithms of a single effect) being applied concurrently by the effects engine 310 and may determine which effect is utilizing the most resources and thus contributing most heavily to a drop in performance. The performance monitor 325 may then adjust the quality parameter associated with the effect contributing most to the performance drop.

Process for Dynamically Controlling Effects

FIG. 4 is a flowchart of one embodiment of a method for dynamically controlling a selected effect in a media stream. In other embodiments, the method may include different and/or additional steps than those shown in FIG. 4. Additionally, steps of the method may be performed in different orders than the order described in conjunction with FIG. 4 in various embodiments.

The effects engine 310 receives 402 input media frames of an input media stream. The effects engine 310 applies 404 a selected effect to the input media frames according to a current quality parameter value of a quality parameter. For example, in one embodiment, the effects may be applied to frames on a frame-by-frame basis as each frame is received. In another embodiment, a group of frames is first received and buffered, and an effect is collectively applied to the buffered frames. A performance metric of a media playback device 320 is monitored 406 to generate a performance metric. The performance may be monitored over a predefined number of frames or over a predefined time period. The performance metric may comprise, for example, a frame rate or average latency over the predefined number of frames or the predefined time period. The performance metric is compared 408 to a target metric. The target metric may be a predefined value or may be a user-adjustable value. The quality parameter is adjusted 410 based on the comparison of the measured performance metric to the target metric. For example, if the performance metric exceeds the target metric, the quality parameter may be increased because this indicates that sufficient processing and storage resources are available to achieve a higher quality rendering of the effect. If the performance metric does not exceed the target metric, the quality parameter may be decreased because this indicates that the available processing or storage resources do not enable the effect to be rendered at the selected level of quality while still meeting the target metric. The process may then repeat for a subsequent set of input media frames. Thus, at each iteration, an effect is applied over a subset of frames of sequence of media frames, a performance is observed, and the quality parameter is adjusted based on the comparison. As a result, the client 110 may automatically adjust the way an effect to achieve the best quality while ensuring that the target metric (e.g., frame rate or latency) is met.

Conclusion

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

The invention claimed is:

1. A method comprising:
receiving an input media stream;
setting a quality parameter to an initial quality parameter value, the quality parameter controlling a quality of a selected effect and an amount of hardware resources of a media processing device used to apply the selected effect;
applying, by the media processing device, the selected effect to a first portion of the input media stream according to the initial quality parameter value to generate a first portion of an output media stream;
monitoring a performance metric of the first portion of the output media stream;
comparing the performance metric of the first portion of the output media stream to a target metric;
responsive to detecting that the performance metric of the first portion of the output media stream is below the target metric, reducing the quality parameter associated with the selected effect to a reduced quality parameter value;
applying, by the media processing device, the selected effect to a second portion of the input media stream according to the reduced quality parameter value to generate a second portion of the output media stream; and
outputting the output media stream.

2. The method of claim 1, wherein applying the selected effect to the second portion of the input media stream according to the reduced quality parameter value uses less computing resources than applying the selected effect to the first portion of the input media stream according to the initial quality parameter value.

3. The method of claim 2, wherein reducing the quality parameter comprises:
determining the reduced quality parameter value such that metric of the second portion of the output media stream increases to at least the target metric.

4. The method of claim 1, wherein applying the selected effect to the first portion of the input media comprises:
extracting a number of facial features from the first portion of the input media stream;
tracking locations of the facial features in the first portion of the input media stream; and
applying the selected effect using the locations of the facial features, wherein the quality parameter controls the number of facial features.

5. The method of claim 1, further comprising:
determining the target metric based on capabilities of the media processing device.

6. The method of claim 1, further comprising:
monitoring respective throughputs of a plurality of effects applied to the first portion of the input media stream; and
identifying the selected effect from among the plurality of effects as having a slowest throughput of the respective throughputs.

7. The method of claim 1, wherein the performance metric comprises a media frame rate or latency.

8. A non-transitory computer-readable storage medium storing instructions that when executed by a processor cause the processor to perform steps including:
receiving an input media stream;
setting a quality parameter to an initial quality parameter value, the quality parameter controlling a quality of a selected effect and an amount of hardware resources of a media processing device used to apply the selected effect;
applying the selected effect to a first portion of the input media stream according to the initial quality parameter value to generate a first portion of an output media stream;
monitoring a performance metric of the first portion of the output media stream;
comparing the performance metric of the first portion of the output media stream to a target metric;
responsive to detecting that the performance metric of the first portion of the output media stream is below the target metric, reducing the quality parameter associated with the selected effect to a reduced quality parameter value;
applying the selected effect to a second portion of the input media stream according to the reduced quality parameter value to generate a second portion of the output media stream; and
outputting the output media stream.

9. The non-transitory computer-readable storage medium of claim 8, wherein applying the selected effect to the second portion of the input media stream according to the reduced quality parameter value uses less computing resources than applying the selected effect to the first portion of the input media stream according to the initial quality parameter value.

10. The non-transitory computer-readable storage medium of claim 9, wherein reducing the quality parameter comprises:
determining the reduced quality parameter value such that metric of the second portion of the output media stream increases to at least the target metric.

11. The non-transitory computer-readable storage medium of claim 8, wherein applying the selected effect to the first portion of the input media comprises:
extracting a number of facial features from the first portion of the input media stream;
tracking locations of the facial features in the first portion of the input media stream; and
applying the selected effect using the locations of the facial features, wherein the quality parameter controls the number of facial features.

12. The non-transitory computer-readable storage medium of claim 8, wherein the instructions when executed further cause the processor to perform a step of:
determining the target metric based on capabilities of the media processing device.

13. The non-transitory computer-readable storage medium of claim 8, wherein the instructions when executed further cause the processor to perform steps including:

monitoring respective throughputs of a plurality of effects applied to the first portion of the input media stream; and identifying the selected effect from among the plurality of effects as having a slowest throughput of the respective throughputs.

14. The non-transitory computer-readable storage medium of claim 8, wherein the performance metric comprises a media frame rate or latency.

15. A computer device comprising:

a processor; and a non-transitory computer-readable storage medium storing instructions that when executed by a processor cause the processor to perform steps including:

receiving an input media stream;

setting a quality parameter to an initial quality parameter value, the quality parameter controlling a quality of a selected effect and an amount of hardware resources of a media processing device used to apply the selected effect;

applying the selected effect to a first portion of the input media stream according to the initial quality parameter value to generate a first portion of an output media stream;

monitoring a performance metric of the first portion of the output media stream;

comparing the performance metric of the first portion of the output media stream to a target metric;

responsive to detecting that the performance metric of the first portion of the output media stream is below the target metric, reducing the quality parameter associated with the selected effect to a reduced quality parameter value;

applying the selected effect to a second portion of the input media stream according to the reduced quality parameter value to generate a second portion of the output media stream; and outputting the output media stream.

16. The computer device of claim 15, wherein applying the selected effect to the second portion of the input media stream according to the reduced quality parameter value uses less computing resources than applying the selected effect to the first portion of the input media stream according to the initial quality parameter value.

17. The computer device of claim 16, wherein reducing the quality parameter comprises:

determining the reduced quality parameter value such that metric of the second portion of the output media stream increases to at least the target metric.

18. The computer device of claim 15, wherein applying the selected effect to the first portion of the input media comprises:

extracting a number of facial features from the first portion of the input media stream;

tracking locations of the facial features in the first portion of the input media stream; and applying the selected effect using the locations of the facial features, wherein the quality parameter controls the number of facial features.

19. The computer device of claim 15, wherein the instructions when executed further cause the processor to perform steps including:

monitoring respective throughputs of a plurality of effects applied to the first portion of the input media stream; and identifying the selected effect from among the plurality of effects as having a slowest throughput of the respective throughputs.

20. The computer device of claim 15, wherein the performance metric comprises a media frame rate or audio track latency.

* * * * *